Oct. 24, 1939.　　　　　I. COWLES　　　　　2,177,095
FLEXIBLE CONDUIT AND COUPLING THEREFOR AND METHOD OF MAKING SAME
Original Filed June 21, 1934　　3 Sheets-Sheet 1
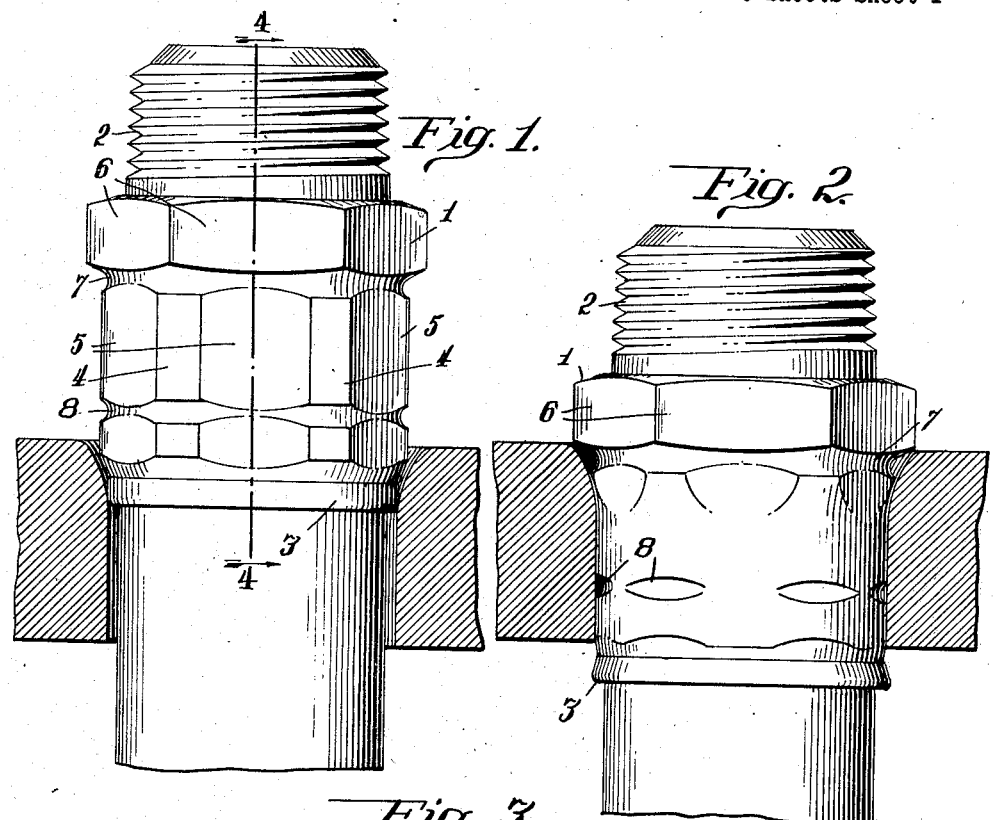
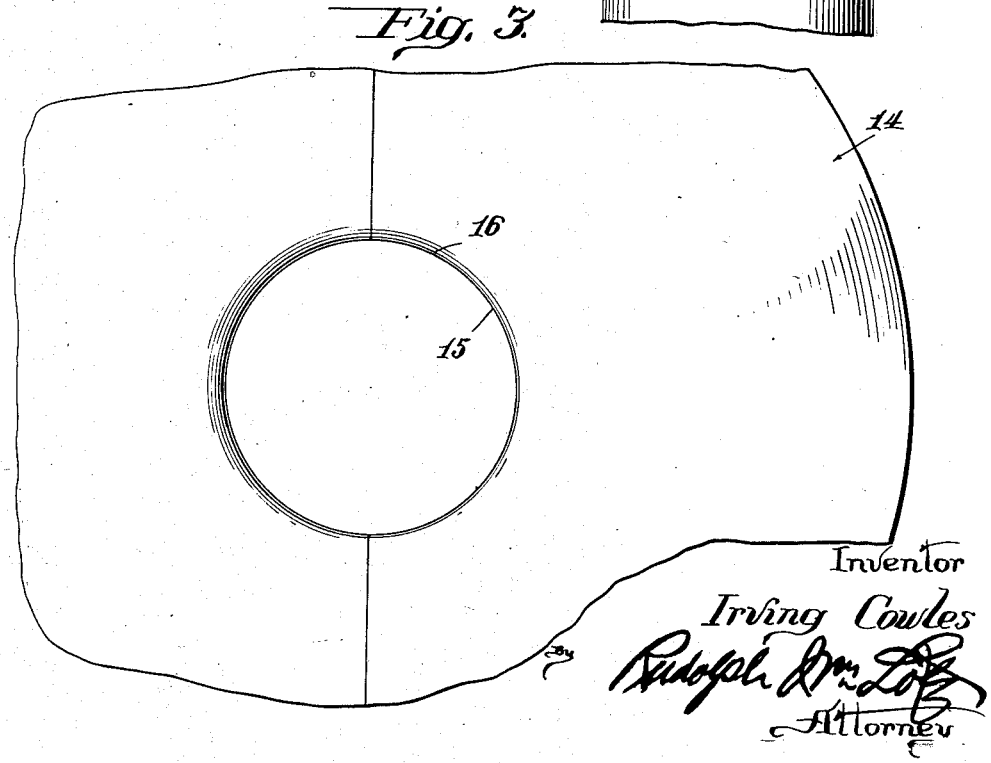
Inventor
Irving Cowles
Rudolph Wm Lotz
Attorney

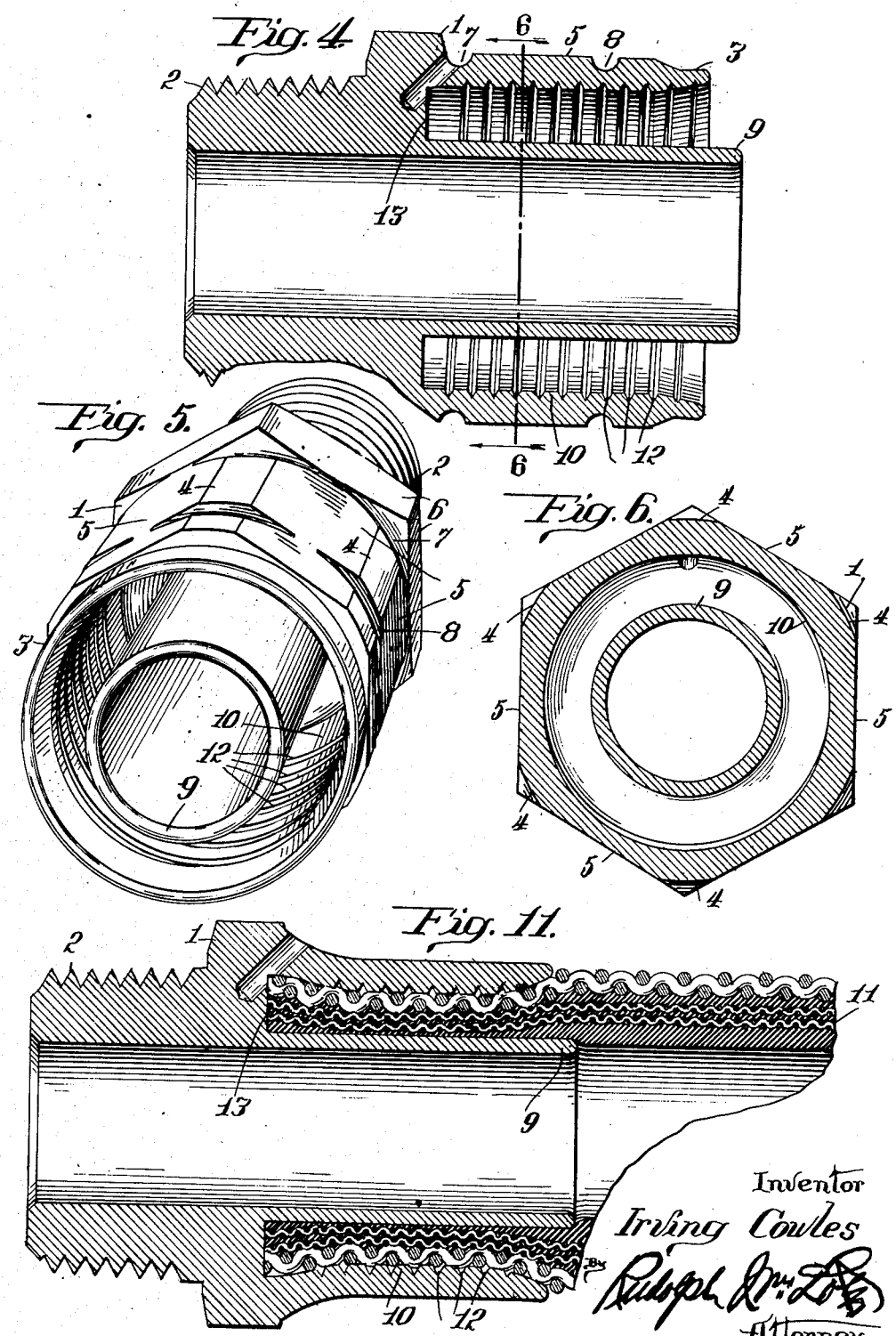

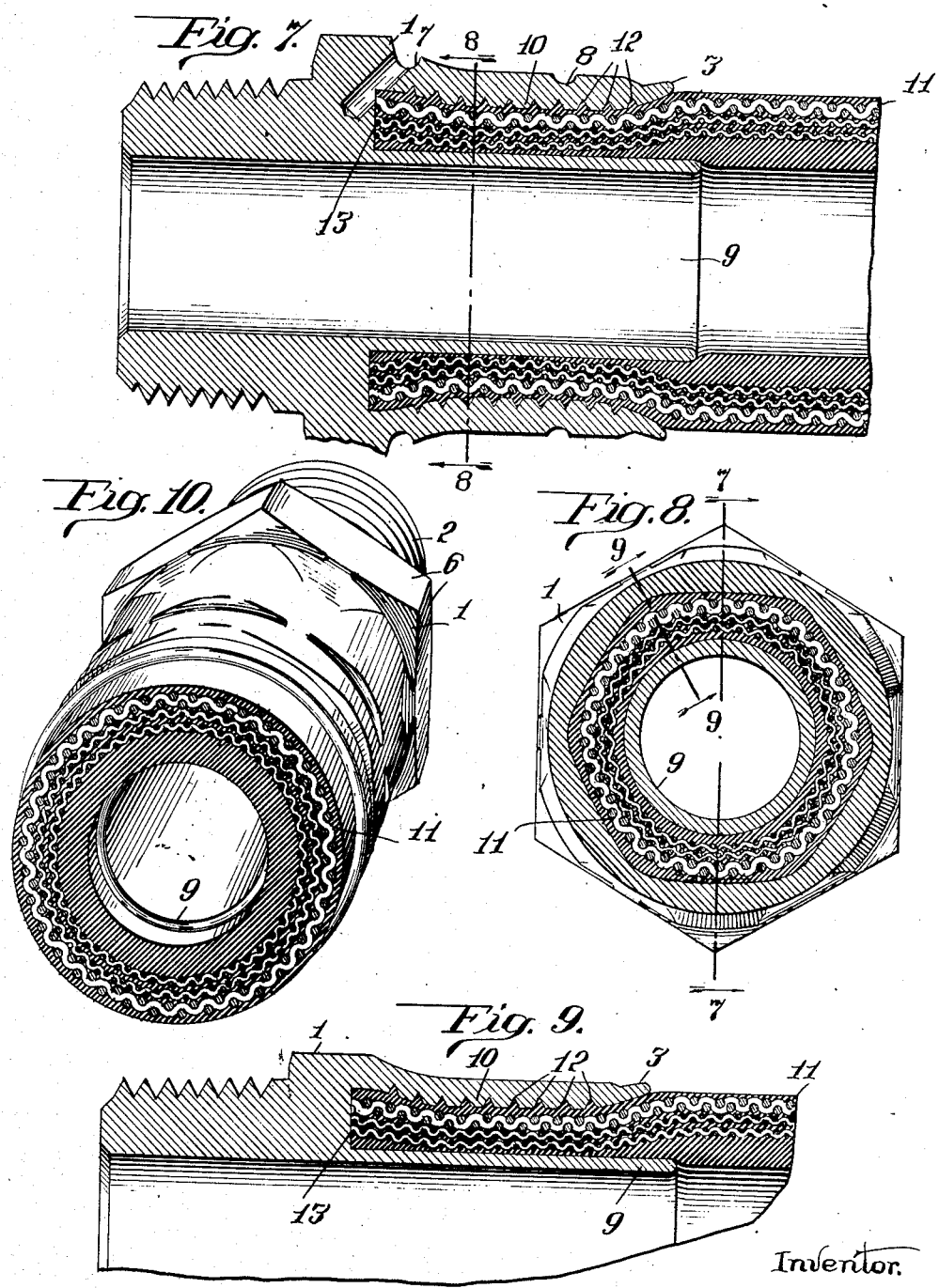

Patented Oct. 24, 1939

2,177,095

UNITED STATES PATENT OFFICE 2,177,095

FLEXIBLE CONDUIT AND COUPLING THEREFOR AND METHOD OF MAKING SAME

Irving Cowles, Detroit, Mich., assignor to himself and R. W. Lotz, Chicago, Ill., as trustees Refiled for abandoned application Serial No. 731,639, June 21, 1934. This application February 15, 1936, Serial No. 64,092

7 Claims. (Cl. 29—157)

The present invention relates to the type of flexible conduits that are used for the transmission of fluids under very high pressure and to the type of couplings therefor known as the "pressed-on" or non-detachable type.

The main object of the present invention is to provide a coupling of the type specified which includes an outer contractible sleeve element which is constructed and arranged to provide for the displacement of the metal of said sleeve during contraction thereof in such a manner as to prevent any substantial elongation of said sleeve, and so to effect displacement and contraction of the sleeve as to cause an inner surface portion thereof to be converted from substantially cylindrical form to an inwardly convex form longitudinally of the sleeve or to what might be termed an inwardly bellied formation, thereby to effect certain new and useful results with respect to the completed conduit of which the coupling forms a part.

Other objects of the invention will be pointed out specifically or will be readily understood from the following specification.

A suitable embodiment of the invention is illustrated in the accompanying drawings, wherein:

Fig. 1 is a view in side elevation of a coupling constructed in accordance with my invention, mounted upon one end portion of a flexible conduit and disposed in its initial position in a contracting die preparatory to effecting contraction of the outer sleeve member.

Fig. 2 is a view similar to Fig. 1 showing the coupling in its position in the contracting die and in its contracted condition.

Fig. 3 is a fragmentary plan view of the die employed for effecting contraction of said coupling sleeve.

Fig. 4 is a central longitudinal sectional view of the structure taken on the line 4—4 of Fig. 1.

Fig. 5 is a perspective view of the coupling.

Fig. 6 is a transverse sectional view taken on the line 6—6 of Fig. 4.

Fig. 7 is a central longitudinal sectional view of the coupling after contraction of its shell upon a conduit taken on the line 7—7 of Fig. 8.

Fig. 8 is a transverse sectional view taken on the line 8—8 of Fig. 7.

Fig. 9 is a view similar to Fig. 7 taken on the line 9—9 of Fig. 8.

Fig. 10 is a perspective sectional view of the structure shown in Figs. 7 and 8.

Fig. 11 is a view similar to Fig. 9 showing a knitted fabric-covered type of hose used.

In recent years, rubber compositions have undergone improvement whereby they resist deterioration by contact with mineral oils or are unaffected by the latter and this has caused rubber hose of the metal-reinforced type to be used extensively in the automotive industry for lubrication purposes, transmission of gasoline and for hydraulic brake oil transmission.

High-pressure greasing of the bearings of automotive vehicles and, in many instances, of the bearings of industrial machinery, has been practiced for some years, the pressures employed having been increased as flexible conduits capable of withstanding increasing pressures became available, together with suitable metallic couplings for connecting the conduit with the source of supply and the point of discharge of the fluid employed.

The provision of couplings which would not become detached from the conduit under the influence of high presures presented a problem that had to be solved before the high-pressure flexible conduit could be utilized to advantage and that problem involved also the provision of couplings which were practical from the standpoints of size, weight, cost and ease of application.

The flexible conduit used for high pressure purposes comprises what may be termed an inner tube portion of rubber, an outer layer of that material and an intermediate layer or series of layers of wire mesh or windings embedded in rubber which is or becomes substantially homogeneous with the inner and outer rubber portions of the conduit wall.

This type of hose or conduit, and also the type which includes an inner tube of helically wound metal, is practically incapable of expansion as by the insertion of a coupling nipple of appreciably larger diameter than the normal internal diameter of the hose, and is contractible to the extent required to hold it in a coupling, only by the application of great force exteriorly.

The inner tube portion of such hose is expansible to a very slight degree so that a nipple, of slightly larger outer diameter than the normal inner diameter of the passage through the hose, may be inserted into the latter. As it is desirable to maintain a substantially uniform diameter passage through the couplings and hose, the coupling nipples are provided with walls as thin as possible, but of sufficient strength to resist contraction under the influence of external pressure exerted upon the hose by contraction of the outer or shell portions of the couplings.

In the case of garden hose, fire hose and pure gum hose devoid of substantially non-expansible reinforcement in its wall, the nipples of couplings have been made of appreciably larger outer diameter than the hose-bore and, in many instances, such nipples have been tapered, the hose being expanded initially by the insertion of the coupling nipples into the hose precedent to contraction of the outer or shell portions of the couplings upon the hose, said shell portions being reduced to appreciably smaller diameter than the outer diameter of the expanded end portion of the hose, it being obvious that the end portions of the hose wall must be compresed to less than its normal thickness between said nipples and shell portions in order to hold the couplings against detachment from the hose.

As shown and described in Letters Patent of the United States No. 1,752,976 granted to me on April 1, 1930, a single-piece coupling member, including an outer cylindrical shell or sleeve, is applied to an end portion of a flexible conduit and said outer sleeve is then contracted progressively from its open toward its closed end. In the operation of contracting said outer shell or sleeve, a displacement of metal occurs as a matter of necessity and causes an elongation of said shell or sleeve which is perceptible at the open end of said shell or sleeve. This elongation causes a slight movement of the metal contra to the direction of progression of such contraction. This progressive contraction has for its particular object to crowd displaceable conduit material inwardly from the mouth of the shell toward the coupling head and the elongation of the sleeve obviously counteracts this crowding of displaceable material, though not to a very appreciable extent.

However, the displacement of metal of the outer shell of the coupling increases with the thickness of the wall of the outer shell or sleeve and the degree of contraction thereof. In the instance of conduits adapted for the transmission of fluids under very high pressure (as for example pressures from ten thousand pounds to twenty-five thousand pounds per square inch), the outer shell of the coupling is required to be correspondingly thicker than in the case of couplings adapted for lower pressures and is also required to be contracted to a far greater extent in order to prevent the coupling from becoming detached from the conduit, so that the elongation above referred to becomes, or is apt to become, excessive and effect greater counter-action to the crowding inwardly of displaced conduit material.

Hence, the main object of the present invention is to provide a coupling of the type specified, having a wall initially of ample thickness to withstand the high pressure referred to above, and wherein progressive contraction of said sleeve from its open toward its closed end may be effected without causing said sleeve to be elongated to an appreciable extent, the invention consisting essentially in providing means whereby the displacement of metal due to such contraction occurs to a large extent laterally and to some extent longitudinally of said sleeve without, however, effecting elongation of said sleeve proportionately to its reduction in diameter.

A further object of the invention is to provide a hose coupling which, by reason of the retention in its shell of material which heretofore has been cut away and constituted waste, can be made of hexagonal rod of smaller size for a coupling for hose of a given outer diameter than has been possible heretofore, thus effecting a very appreciable cost economy reflected in the lower cost of the rod and lower cost of cutting away excess material from the same.

Another object of the invention is to provide a flaring mouth for the coupling without cutting away any appreciable portion of the material lying within the mouth portion, but which is produced by distortion of said mouth portion resulting from the displacement of metal due to contraction of the outer sleeve, the flaring mouth being desirable to prevent cutting of the outer conduit wall during flexing of the conduit after the couplings have been applied to the same.

The coupling of this invention, as shaped initially, is shown in Fig. 1 as composed of hexagonal rod of the size shown at 1 in Fig. 1, said portion 1 constituting the body portion thereof. This rod is cut away at one end portion to provide the threaded nipple 2 or other formation from engaging said coupling with a companion element.

The other end portion or extremity of rod length employed in the manufacture of the coupling is cut away annularly to provide a relatively thin and short cylindrical end portion 3 which may be termed a lip member, the latter being initially slightly flared internally on an arc of relatively large radius and having a rounded or radiused extremity. Externally said lip is initially cylindrical.

The portion of the rod length lying between the lip 3 and the body member 1 is cut by a lathe to remove corner portions 4 to render them arcuate and dispose them in a cylindrical plane. The surface portion 5 of the shell alternating with the said arcuate portions 4 remain flush with the flat surface 6 of the body portion 1.

Annular grooves 7 and 8 are cut into the outer face of the rod length at the selected points which, in the instance illustrated occur adjacent to the body member 1 and between the ends of the remaining portions of the now substantially twelve sided portion of the coupling. The number of said annular grooves may be varied and their relative locations changed, depending upon the length of the shell and determined by other factors incident to the particular conditions presented.

The depth of the said grooves 7 and 8 preferably, is equal approximately to about one-third of the thickness of the shell at its thinnest points. The grooves are substantially semi-cylindrical in cross section at the last-mentioned points of least thickness of the shell, but the shapes and depths of said grooves may be varied appreciably.

Preferably, the portion of the coupling lying between the head 1 and the extremity of the lip member 3 constitutes an outer shell integral with the coupling body and nipple 2 and defines an annular chamber in cooperation with the cylindrical sleeve or nipple 9 which is also integral with the coupling head and has a bore of a diameter coincident with that of the body portion of the coupling, the outer face of the nipple 9 and the inner face of the shell, which I have designated 10 for purposes of convenience, are both initially cylindrical and the annular space bordered by said members 9 and 10 is of a width radially slightly less than the normal thickness of the cylindrical wall of the flexible conduit 11. Said outer shell is equipped, preferably with internal screw thread formations 12 for engaging the outer flexible surface portion of the conduit 11 which is suitably forced into said annular space by a relative rotation of the said coupling and said conduit 11 in one direction, so that the extremity of the conduit is thus eventually forced into close contact with the end wall 13 of said annular chamber.

A die 14 having a cylindrical aperture 15 provided with a flaring mouth portion 16 is locked against separation of its component members after the free portion of the conduit has been disposed within said apertures, the flaring mouth 16 of said aperture of said die being opposed to the edge of the lip portion 3 of the coupling. The outer diameter of said lip portion 3 is preferably equal to or slightly greater than that of the said aperture 15. The depth of the die 14 is equal, substantially, to the length of the twelve-sided portion of the shell so that when the latter is in the position in the die shown in Fig. 2, the lip portion is free.

By means of a punch-press or other forcing element the coupling is now forced downwardly into the die 12 until said coupling has attained the position shown in Fig. 2, whereupon, the outer surface of said coupling becomes mainly cylindrical, portions of the metal, as for example, the portions radially inwardly of the arcuate surface parts 4 being placed, in part, laterally into the surface portions 5 and the narrower and shallower portions of the grooves 7 and 8 disappearing entirely as also shown in Fig. 2, due to displacement of metal longitudinally of the shell.

Some elongation of the said shell 1 occurs and by reason of displacement of metal in the body of said shell 10 the lip member 3 is automatically flared to the position shown in Fig. 2 and as shown in Figs. 7 and 9.

It will be noted that the inner wall portion of the shell 10 does not remain cylindrical but becomes of a gradually decreasing diameter from its mouth portion to a portion between the ends of said sleeve. The progressive contraction of said sleeve 10 causes the displaceable hose wall material of the conduit 11 to be forced toward and against the terminal inner end or shoulder 13 of the annular chamber of the coupling and produces what may be termed a wedge member, which acts to prevent the conduit from being withdrawn or forced out of said annular chamber, this wedge member and its effect being fully described in said Letters Patent No. 1,752,976.

The inner contour of the shell 10 as shown in Fig. 8, is substantially hexagonal throughout the length of the shell of the coupling, except as to the lip portion thereof, after contraction of said shell, due to the fact that the portions 4 of said shell were subjected to the greatest degree of pressure in the contracting die. But during contraction of the shell, the resistance of the conduit 11 to contraction causes lateral displacement of hose wall material and such distribution of the same as to equalize substantially all radial pressure on the conduit so that leakage around the nipple 9 is prevented as effectually as if the cylindrical contour of the conduit were preserved. This has been determined by exhaustive tests wherein the conduit equipped with said couplings withstood a pressure of more than eighteen thousand pounds per square inch without leakage, the flexible conduit having burst at the high pressure point. This result is attributable to the fact that the shell of the coupling of this invention contains approximately nineteen percent more metal than an initially externally cylindrical shell of the same internal diameter as heretofore made.

By reason of the lateral and longitudinal displacement of shell material during contraction of the same as hereinabove pointed out, the elongation is no greater than in the case of a cylindrical shell of the same internal diameter and cut from the same size hexagonal rod. Thus, in the instance of a shell and hexagonal body portion having a combined length of one and $\frac{13}{32}$ inches initially, the elongation after contraction of the shell amounts to $\frac{1}{32}$ of an inch. The shell of the coupling was one and $\frac{3}{32}$ inches in length, so that the elongation in contraction amounted to less than three percent of the initial length of said shell and was no greater than the elongation of an initially externally cylindrical shell of the same length and inner diameter.

As elongation of the shell occurs in a direction contra to that of progressive contraction of the shell, the reduction of such elongation to the minimum is important since it occurs also in a direction opposed to that of displacement of hose-wall material during the contraction of the shell.

In Fig. 11, I have illustrated a type of conduit similar to that shown in Figs. 7 to 10, inclusive, but which is provided with a knitted jacket of cotton or other fibre impregnated with creosote or similar material or compound for protective purposes.

In mounting the coupling of the present invention on this conduit, it was found that the impregnating material was forced out of the said jacket during progressive contraction of the coupling shell in the form of a viscous liquid which became trapped at the inner end portion of the shell and tended to force the conduit out of said shell. To obviate this difficulty, I provided a small leak opening which communicates with the inner end of the annular chamber of the coupling, preferably as shown in Fig. 11, said opening being adapted for use also in connection with any coupling wherein the shell is contracted progressively from its mouth portion to its inner end portion.

I claim as my invention:

1. A hose coupling comprising a body member having an axial bore and terminating at one end in a shell concentric with and spaced from the said bore, said shell being substantially cylindrical internally and adapted to receive an end portion of a hose, and having a substantially polygonal outer surface, said shell being contractible radially, a central stem in said coupling disposed within said shell and entering the hose end as the latter is inserted into the said shell, said stem cooperating with said hose during contraction of said shell and the latter, when contracted, presenting a substantially cylindrical outer face and a substantially polygonal inner face.

2. A hose coupling comprising a body member having an axial bore and terminating at one end in a shell concentric with and spaced from the said bore, said shell being substantially cylindrical internally and adapted to receive an end portion of a hose and having a substantially polygonal outer surface and being provided externally with annular grooves presenting substantially circular bottoms concentric with the bore of said coupling, said shell being contractible upon the hose end portion and when contracted presenting a substantially polygonal inner face with said annular grooves converted into series of spaced apart recesses.

3. A hose coupling comprising a body portion fo geometric cross-sectional form such as a hexagon and having a central longitudinal bore, the corners of the polygonal surface of said body portion being cut away and said end portion being hollow and presenting a substantially cylindrical inner face concentric with and of larger diameter than said bore and constituting a contractible shell adapted to receive a hose end, a tubular member disposed within the hose end for cooperation with the latter to resist contraction of the said shell, the latter when contracted presenting a substantially cylindrical outer surface and a substantially polgonal inner surface, the faces of the said inner surface being disposed in staggered relation to the faces of the uncontracted portion of said body portion.

4. A hose coupling including a contractible shell portion adapted to receive the end portion of a hose, said shell being varied in thickness at different spaced apart portions extending longitudinally thereof and being provided externally with spaced apart annular grooves, said shell having non-cylindrical outer faces alternated with said grooves.

5. The hereindescribed method of making a flexible conduit which consists in first producing a coupling member equipped with an internally cylindrical shell of internal diameter substantially equal to the outer diameter of a hose end portion disposed within the same and having an exterior substantially polygonal surface concentric with the said inner surface, disposing such hose end portion within said shell and thereafter contracting and at the same time reshaping said shell to render its inner surface substantially polygonal and its outer surface substantially cylindrical throughout substantially the entire length of the shell.

6. The hereindescribed method of making a flexible conduit which consists in first producing a coupling member equipped with an internally cylindrical shell of internal diameter substantially equal to the outer diameter of a hose end portion disposed within the same and having an exterior substantially polygonal surface concentric with the said inner surface and presenting a lip along its mouth having its inner surface flush with that of the inner surface of the remainder of the shell and being externally substantially cylindrical and of appreciably smaller diameter than the smallest diametric distance between faces of the outer surface of the remainder of the shell, disposing such hose end portion within said shell and thereafter contracting and at the same time re-shaping said shell to render substantially all of the same, except said lip, polygonal interiorly and substantially cylindrical externally and during such contraction causing said lip to curl outwardly to provide a flared mouth for said shell.

7. The hereindescribed method of making a flexible conduit which consists in first producing a coupling member equipped with an internally cylindrical shell of internal diameter substantially equal to the outer diameter of a hose end portion disposed within the same and having an exterior substantially polygonal surface concentric with the said inner surface and presenting a lip along its mouth having its inner surface flush with that of the inner surface of the remainder of the shell and being externally substantially cylindrical and of appreciably smaller diameter than the smallest diametric distance between faces of the outer surface of the remainder of the shell, disposing such hose end portion within said shell and thereafter contracting and at the same time re-shaping said shell to render substantially all of the same, except said lip, polygonal interiorly and substantially cylindrical externally and during such contraction causing said lip to curl outwardly to provide a flared mouth for said shell without touching said lip.

IRVING COWLES.